United States Patent
Anne

(10) Patent No.: US 9,549,038 B1
(45) Date of Patent: Jan. 17, 2017

(54) CACHEABLE RESOURCE LOCATION SELECTION

(71) Applicant: Amazon Technologies, Inc., Reno, NV (US)

(72) Inventor: Dharma Teja Naga Venkata Anne, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 217 days.

(21) Appl. No.: 13/967,260

(22) Filed: Aug. 14, 2013

(51) Int. Cl.
*G06F 15/167* (2006.01)
*H04L 29/08* (2006.01)
*G06F 17/30* (2006.01)

(52) U.S. Cl.
CPC ..... *H04L 67/2842* (2013.01); *G06F 17/30861* (2013.01); *G06F 17/30905* (2013.01); *H04L 67/10* (2013.01)

(58) Field of Classification Search
None
See application file for complete search history.

(56) References Cited

U.S. PATENT DOCUMENTS

| 7,653,689 | B1 | 1/2010 | Champagne et al. |
| 8,356,074 | B1 * | 1/2013 | Ehrlich et al. ............... 709/203 |
| 2002/0078233 | A1 | 6/2002 | Biliris et al. |
| 2003/0187917 | A1 * | 10/2003 | Cohen .......................... 709/203 |
| 2011/0035497 | A1 * | 2/2011 | Daly et al. .................... 709/226 |
| 2012/0124372 | A1 | 5/2012 | Dilley et al. |
| 2013/0066684 | A1 | 3/2013 | Raciborski et al. |
| 2013/0103785 | A1 * | 4/2013 | Lyon ............................ 709/217 |
| 2014/0156798 | A1 | 6/2014 | Jasinskyj |
| 2015/0207660 | A1 | 7/2015 | Sundaram et al. |
| 2015/0371010 | A1 | 12/2015 | Cohen et al. |

* cited by examiner

*Primary Examiner* — Wing F Chan
*Assistant Examiner* — Padma Mundur
(74) *Attorney, Agent, or Firm* — Knobbe, Martens, Olson & Bear, LLP

(57) ABSTRACT

Systems and methods for rewriting code related to a network page are described herein. The systems and methods can determine whether the network page includes cacheable resources. Responsive to the determination, the systems and methods can rewrite the code for the network page to cause a user system to access the cacheable resource from a content distribution network. Further, the systems and methods can determine whether access to the cacheable resource should be provided via the content distribution network or a proxy server based at least partially on a relative location of the proxy server and the content distribution network to the user system requesting access to the network page.

23 Claims, 5 Drawing Sheets

CACHEABLE RESOURCE LOCATION SELECTION

The present application was filed on the same day, Aug. 14, 2013, and shares a common specification with U.S. application Ser. No. 13/967,295, titled "SYSTEMS AND METHODS FOR AUTOMATICALLY REWRITING NETWORK PAGE CODE," which is hereby incorporated by reference in its entirety herein.

BACKGROUND

Generally described, computing devices and communication networks can be utilized to exchange information. In a common application, a computing device can request content from another computing device via the communication network. For example, a user at a personal computing device can utilize a software browser application, typically referred to as a browser software application, to request a Web page from a server computing device via the Internet. In such embodiments, the user computing device can be referred to as a client computing device and the server computing device can be referred to as a content provider.

In some cases, the client computing device may communicate with the content provider through a proxy service. The proxy service, which may be hosted by a proxy server, may provide an intermediary service between the content provider and the client computing device. The use of the proxy service can result in a number of benefits including anonymity, auditing, data loss prevention, and to implement access policies.

BRIEF DESCRIPTION OF THE DRAWINGS

Throughout the drawings, reference numbers are re-used to indicate correspondence between referenced elements. The drawings are provided to illustrate embodiments of the inventive subject matter described herein and not to limit the scope thereof.

DETAILED DESCRIPTION

Introduction

Figure 1:
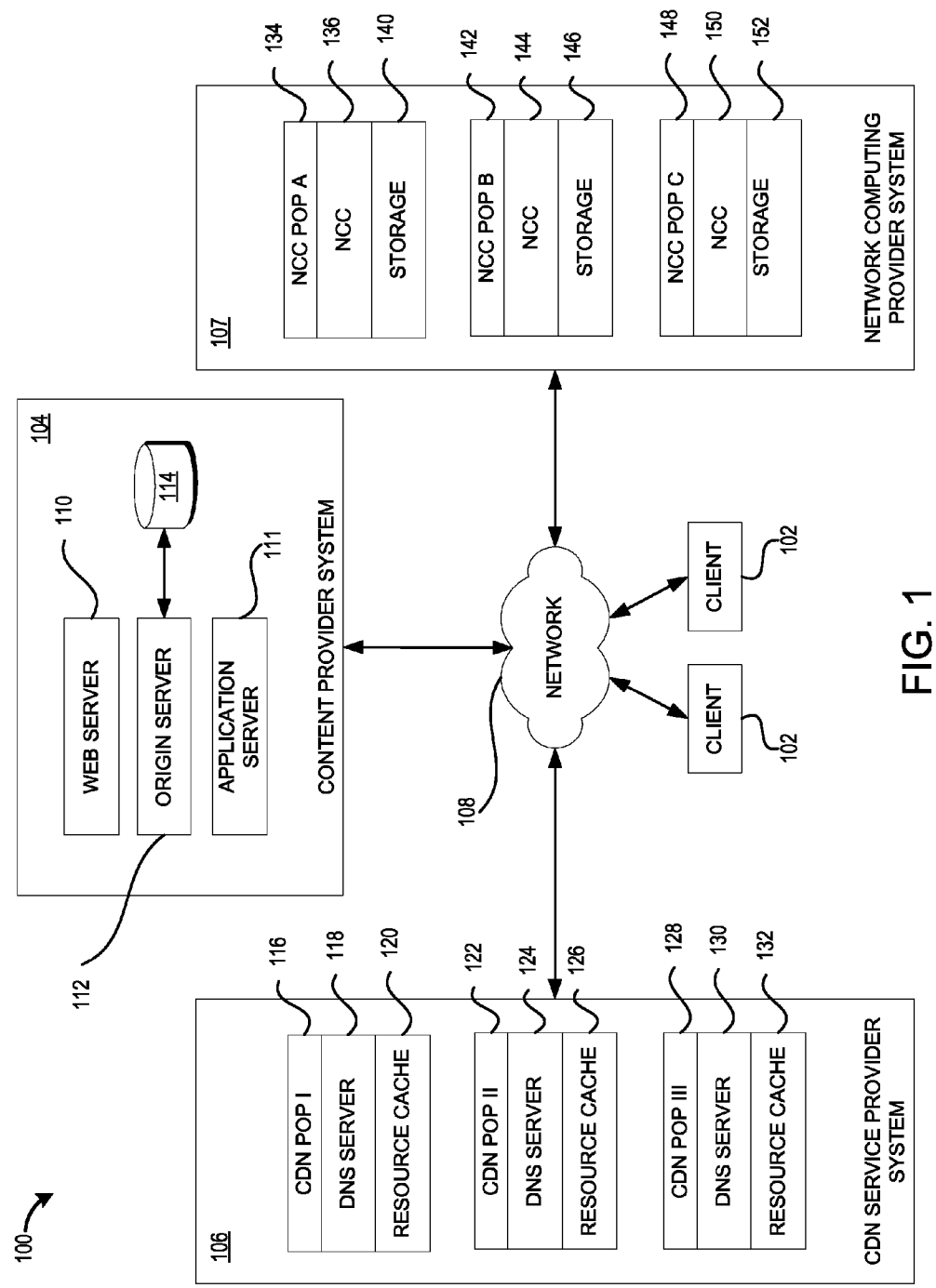
FIG. 1 illustrates an embodiment of a networked computing environment including a number of client computing devices, a content provider, a content delivery network service provider, and a network computing provider.

In addition to the aforementioned uses, a proxy service may be used to speed up accesses to resources associated with a network page and to reduce the amount of bandwidth required for accessing the network page. One method of accomplishing the increased access speed and reduced bandwidth utilization for accessing the network page is to cache at least some of the resources associated with the network page at the proxy server or using the proxy service. By caching resources at the proxy server, accesses to a content provider may be reduced, which in some cases can both increase access speed and reduce bandwidth usage.

In some cases, when using the proxy service to cache resources, access speed for accessing the network page may be reduced. One reason for the reduction in access speed is that the user computing system may be located further from the proxy service provider than from the content provider.

In some instances, an entity associated with the proxy service, such as an owner or administrator of the proxy service, may have access to a content distribution network (CDN). The CDN may be used to store at least some of the resources referenced by the network page. In cases where a location of the CDN is closer than a location of the proxy service, and/or the content provider, accessing the resources at the CDN may increase the speed for accessing the network page. Further, bandwidth requirements may be reduced because, for example, the path for accessing the resource may be shortened and/or less users may access the network page from the same system due to, for example, distribution of the location of users.

Embodiments disclosed herein present systems and methods for rewriting the code associated with a network page to redirect access to resources to a CDN. The resources, or references to the resources, may be analyzed to determine whether the resources are cacheable. If the resources are cacheable, copies of the resources may be stored at the CDN. A network computing component (NCC) of a network computing provider system may rewrite the code associated with the network page to access the cacheable resources at the CDN. The rewritten network page may then be provided to a user computing system that requested the network page. In some cases, the network page may be streamed to the user computing system as the network page is being rewritten enabling the user computing system to begin accessing non-cacheable resources from the content provider system or from a proxy service at the NCC. Further, in some cases, by streaming the rewritten network page, cacheable resources referenced in the rewritten network page may be accessed while another portion of the network page is being rewritten.

Certain embodiments disclosed herein inlcude systems and methods that can determine whether to rewrite a network page based on the location of the user computing system requesting the network page relative to one or more locations of the NCC, the CDN, and/or the content provider system. Further, in cases where the network page is rewritten, the selection of a CDN location, or point of presence (POP), may be based at least partially on the location of the user computing device.

Example Content Delivery Environment

FIG. 1 illustrates an embodiment of a content delivery environment or a networked computing environment 100 configured to provide access to content. The network computing environment 100 can include a number of client computing devices 102. Further, although only one of each is illustrated, the networked computing environment 100 can include one or more content provider systems 104, one or more content delivery network ("CDN"), or content distribution network, service provider systems 106, and one or more network computing provider systems 107.

As illustrated in FIG. 1, the networked computing environment 100 includes a number of client computing devices 102 (generally referred to as clients) for requesting content and content processing from a content provider system 104, CDN service provider system 106, or network computing provider system 107. In an illustrative embodiment, the client computing devices 102 can correspond to a wide variety of computing devices including personal computing devices, laptop computing devices, hand-held computing devices, terminal computing devices, mobile devices (e.g., mobile phones, smart phones, tablet computing devices, etc.), wireless devices, various electronic devices and appliances, video game systems, kiosks, and the like. In an illustrative embodiment, the client computing devices 102 include hardware and software components for establishing communications over a communication network 108. For example, the client computing devices 102 may be equipped with networking equipment and browser software applications that facilitate communications via a network (e.g., the Internet) or an intranet. The client computing devices 102 may have varied local computing resources such as central processing units and architectures, memory, mass storage, graphics processing units, communication network availability and bandwidth, etc. Although termed "client" computing devices, the client computing devices 102 can include any type of user computing device and is not limited to a client device of a client/server architecture.

The network 108 can include any type of communication network. For example, the network 108 can include one or more of a wide area network (WAN), a local area network (LAN), a cellular network, an ad hoc network, a satellite network, a wired network, a wireless network, etc. Further, in some cases, the network 108 can include the Internet.

The networked computing environment 100 can also include a content provider system 104 in communication with the one or more client computing devices 102 or other service providers (e.g., CDN service provider system 106, network computing provider system 107, etc.) via the communication network 108. The content provider system 104 illustrated in FIG. 1 may correspond to a logical association of one or more computing devices associated with a content provider entity. Specifically, the content provider system 104 can include a web server component 110 corresponding to one or more server computing devices for obtaining and processing requests for content (such as Web pages) from the client computing devices 102 or other service providers. The content provider system 104 can further include an origin server component 112 and associated storage component 114 corresponding to one or more computing devices for obtaining and processing requests for network resources from the CDN service provider system 106. The content provider system 104 can still further include an application server computing device 111, such as a data streaming server, for processing streaming content requests. One skilled in the relevant art will appreciate that the content provider system 104 can be associated with various additional computing resources, such as additional computing devices for administration of content and resources, domain name system ("DNS") name servers, and the like. For example, although not illustrated in FIG. 1, the content provider system 104 can be associated with one or more DNS name server components that would be authoritative to resolve client computing device DNS queries corresponding to a domain of the content provider. Further, although termed "server" computing devices, the web server 110, origin server 112, and application server 111 can include any type of computing devices for providing access to a network resource and are not limited to servers of a client/server architecture.

With continued reference to FIG. 1, the networked computing environment 100 can further include a CDN service provider system 106 in communication with the one or more client computing devices 102 and other service providers via the communication network 108. The CDN service provider system 106 illustrated in FIG. 1 may correspond to a logical association of one or more computing devices associated with a CDN service provider entity. Specifically, the CDN service provider system 106 can include a number of Point of Presence ("POP") locations 116, 122, 128 that correspond to nodes on the communication network 108. In some cases, the CDN POP locations 116, 122, and 128 may be geographically disparate. For example, the CDN POP 116 may correspond to a CDN located in New York, the CDN POP 122 may correspond to a CDN located in California, and the CDN POP 128 may correspond to a CDN located in London.

Each CDN, located at the CDN POPs 116, 122, 128, may include a DNS component 118, 124, 130 made up of a number of DNS server computing devices for resolving DNS queries from the client computers 102 or other computing systems (e.g., the NCCs 136, 144, 150). Each CDN, located at the CDN POPs 116, 122, 128, may also include a resource cache component 120, 126, 132 made up of a number of cache server computing devices for storing resources from content providers and transmitting various requested resources to various client computers. The DNS components 118, 124, and 130 and the resource cache components 120, 126, 132 may further include additional software and/or hardware components that facilitate communications including, but not limited to, load balancing or load sharing software/hardware components.

In an illustrative embodiment, the DNS component 118, 124, 130 and resource cache component 120, 126, 132 are considered to be logically grouped, regardless of whether the components, or portions of the components, are physically separate. Additionally, although the CDN POPs 116, 122, 128 are illustrated in FIG. 1 as logically associated with the CDN service provider system 106, the CDN POPs will be geographically distributed throughout the communication network 108 in a manner to best serve various demographics of client computing devices 102. Additionally, one skilled in the relevant art will appreciate that the CDN service provider system 106 can be associated with various additional computing resources, such as additional computing devices for administration of content and resources, and the like.

With further continued reference to FIG. 1, the networked computing environment 100 can also include a network computing provider system 107 in communication with the one or more client computing devices 102, the CDN service provider system 106, and the content provider system 104 via the communication network 108. The network computing provider system 107 illustrated in FIG. 1 may correspond to a logical association of one or more computing devices associated with a network computing provider entity. Specifically, the network computing provider system 107 can include a number of Point of Presence ("POP") locations 134, 142, 148 that correspond to nodes on the communication network 108. In some cases, the POP locations 134, 142, and 148 may be geographically disparate. For example, the POP 134 may correspond to a node located in New York, the POP 142 may correspond to a node located in California, and the POP 148 may correspond to a node located in London.

Each POP 134, 142, 148 may include one or more network computing components (NCCs) 136, 144, 150 for hosting applications, such as data streaming applications, via a number of instances of a virtual machine, generally referred to as an instance of an NCC. In some cases, the NCCs 136, 144, 150 may provide access to physical resources (e.g., storage, processors, etc.). Further, the NCCs 136, 144, 150 may provide access to network pages (e.g., webpages) and/or other network resources that may be hosted by the content provider system 104.

One skilled in the relevant art will appreciate that NCC 136, 144, 150 can include physical computing device resources and software to provide the multiple instances of a virtual machine or to dynamically cause the creation of instances of a virtual machine. Such creation can be based on a specific request, such as from a client computing device, or the NCC can initiate dynamic creation of an instance of a virtual machine on its own.

Each NCC POP 134, 142, 148 may also include one or more storage components 140, 146, 152 made up of a number of storage devices for storing any type of data used in the delivery and processing of network or computing resources, including but not limited to user data, state information, processing requirements, historical usage data, and resources from content providers that can be processed by an instance of an NCC 136, 144, 150 and transmitted to various client computers, etc. The NCCs 136, 144, 150 and the storage components 140, 146, 152 may further include additional software and/or hardware components that facilitate communications including, but not limited to, load balancing or load sharing software/hardware components for selecting instances of a virtual machine supporting a requested application and/or providing information to a DNS name server to facilitate request routing. In some embodiments, the storage components 140, 146, 152 may be included as part of the NCCs 136, 144, 150 respectively. As will be described further with reference to FIG. 2, the NCC POPs 136, 144, 150 may include additional systems for providing client computing devices 102 with improved access to network pages and associated network resources.

In an illustrative embodiment, NCCs 136, 144, 150 and the storage components 140, 146, 152 are considered to be logically grouped, regardless of whether the components, or portions of the components, are physically separate. For example, a network computing provider system 107 may maintain separate POPs for providing the NCC and the storage components. Additionally, although the NCC POPs 134, 142, 148 are illustrated in FIG. 1 as logically associated with a network computing provider system 107, the NCC POPs may be geographically distributed throughout the communication network 108 in a manner to best serve various demographics of client computing devices 102. Additionally, one skilled in the relevant art will appreciate that the network computing provider system 107 can be associated with various additional computing resources, such as additional computing devices for administration of content and resources, and the like. Even further, one skilled in the relevant art will appreciate that the components of the network computing provider system 107 and components of the CDN service provider system 106 can be managed by the same or different entities.

Although FIG. 1 illustrates one content provider system 104, one CDN service provider system 106, and one network computing provider system 107, the networked computing environment 100 is not limited as such. The networked computing environment 100 may include a plurality of content providers 104, CDN service providers 106, and/or network computing providers 107. Further, each of the content providers 104, CDN service providers 106 and/or network computing providers 107 may be associated with different entities.

Second Example Networked Computing Environment

Figure 2:
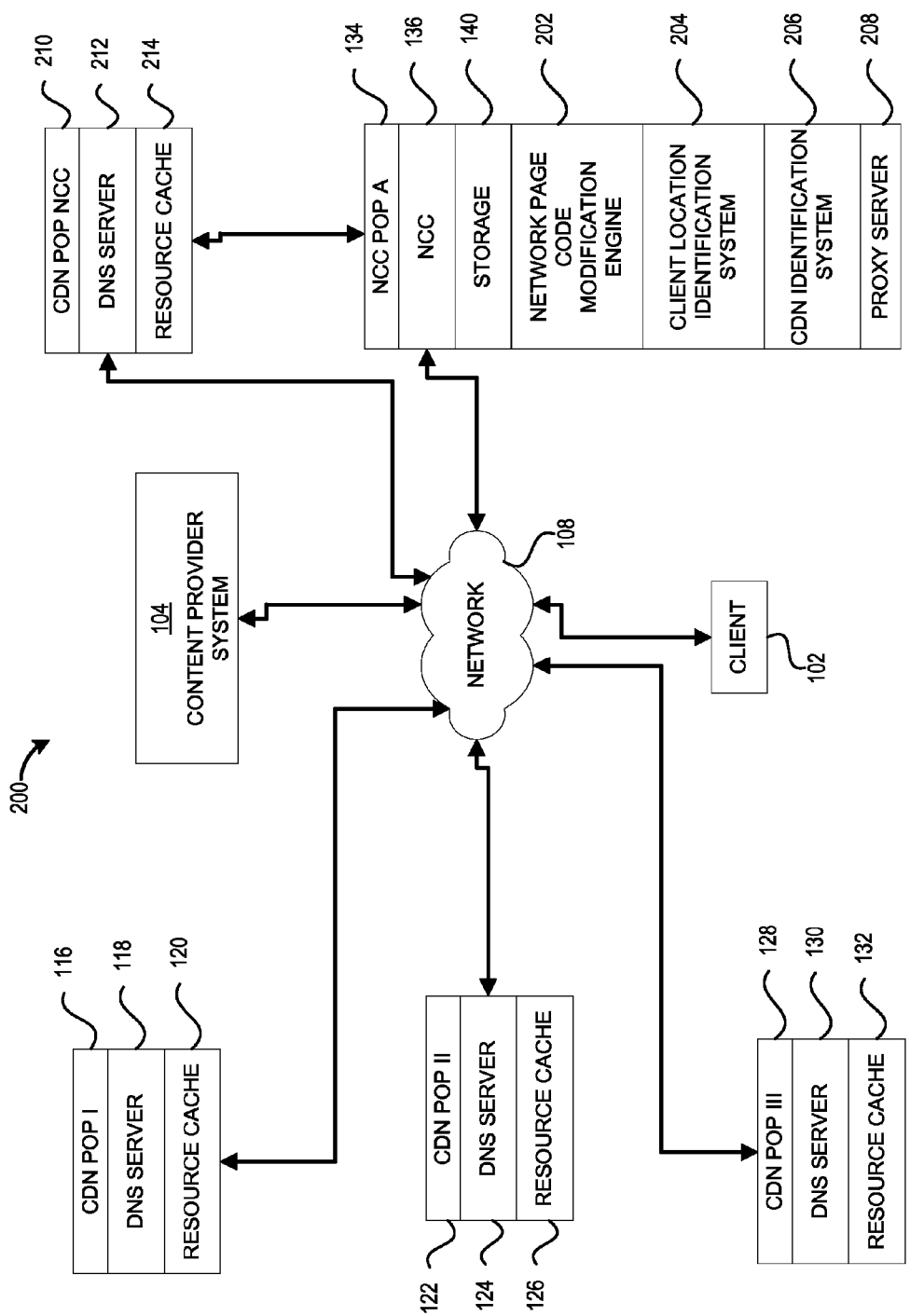
FIG. 2 illustrates another embodiment of the networked computing environment.

FIG. 2 illustrates another embodiment of the networked computing environment 200. As previously stated, and as illustrated in FIG. 2 by the separation from the CDN service provider system 106 of FIG. 1, the CDN POPs 116, 122, 128 may be geographically separate. Further, as previously stated, more than one CDN service provider system may exist. In some cases, the CDN service provider systems may be associated with different entities from each other, and different entities from the network computing provider systems 107. However, in some cases, a CDN service provider system may be associated with the same entity as a network computing provider system 107. For example, the CDN POP 210 may be part of a CDN service provider system that is associated with the same entity as the entity associated with the network computing provider 107, which includes the NCC POP 134. In such cases, the NCC POP 134 may be able to communicate with the CDN POP 210 via a network internal to the entity associated with the two systems as well as or instead of communicating via the network 108.

The CDN POP 210 may include some or all of the embodiments previously described with respect to the CDN POPs 116, 122, 128. For example, the CDN POP 210 may include a number of computing systems including one or more DNS servers 212 and one or more resource caches 214. The DNS servers 212 may include some or all of the embodiments previously described with respect to the DNS servers 118, 124, 130. Further, the resource caches 214 may include some or all of the embodiments previously described with respect to the resource caches 120, 126, 132.

As previously described, the NCC POPs 134, 142, 148 may include one or more NCCs 136 and one or more storage systems 140. In addition, as illustrated by the NCC POP 134, the NCC POPs may include a number of additional systems. Each of the additional systems may be separate systems located at the NCC POPs and/or may be part of the NCCs. For example, the NCC POP 134 may include a network page code modification engine 202, a client location identification system 204, a CDN identification system 206, and a proxy server 208. Further, one or more of the network page code modification engine 202, the client location identification system 204, the CDN identification system 206, and the proxy server 208 may be included as part of the NCC 136.

The network page code modification engine 202 can include any system that can rewrite code used for generating a network page. The code may be any type of code including, for example, HyperText Markup Language (HTML), eXtensible Markup Language (XML), eXtensible HTML (XHTML), JavaScript Object Notation (JSON), AJAX, etc. In certain embodiments, the network page code modification engine 202 can be used to rewrite at least part of a network page to change the source of a cacheable resource. In some such cases, the cacheable resource can be accessed from a CDN instead of via the proxy server 208 improving the speed of access of the cacheable resource.

In some cases, the decision of whether to use a CDN and/or the decision of the CDN POP to use may depend on the location of the user computing system, or client device 102. This location may be determined by the client location identification system 204 using one or more processes for establishing a system location. For example, the client location identification system 204 may use an Internet Protocol (IP) address, GPS information, or query a user to determine the location of the client 102, etc.

The CDN identification system 206 can include any system for identifying a CDN and/or a CDN POP for storing the cacheable resource. In some cases, the CDN identification system 206 can determine the physical location of the CDN POP. Further, the CDN identification system 206 may determine the location in a network (e.g., the network 108) for a system (e.g., the resource cache 214) included in the CDN.

The proxy server 208 can include any type of proxy server or proxy service which can act as an intermediary for accessing a network page. For example, the proxy server 208 may include a web proxy. The proxy server 208 may be used to speed up network page access by, for example, caching frequently accessed cacheable resources.

Example Network Page Code Modification Process

Figure 3:
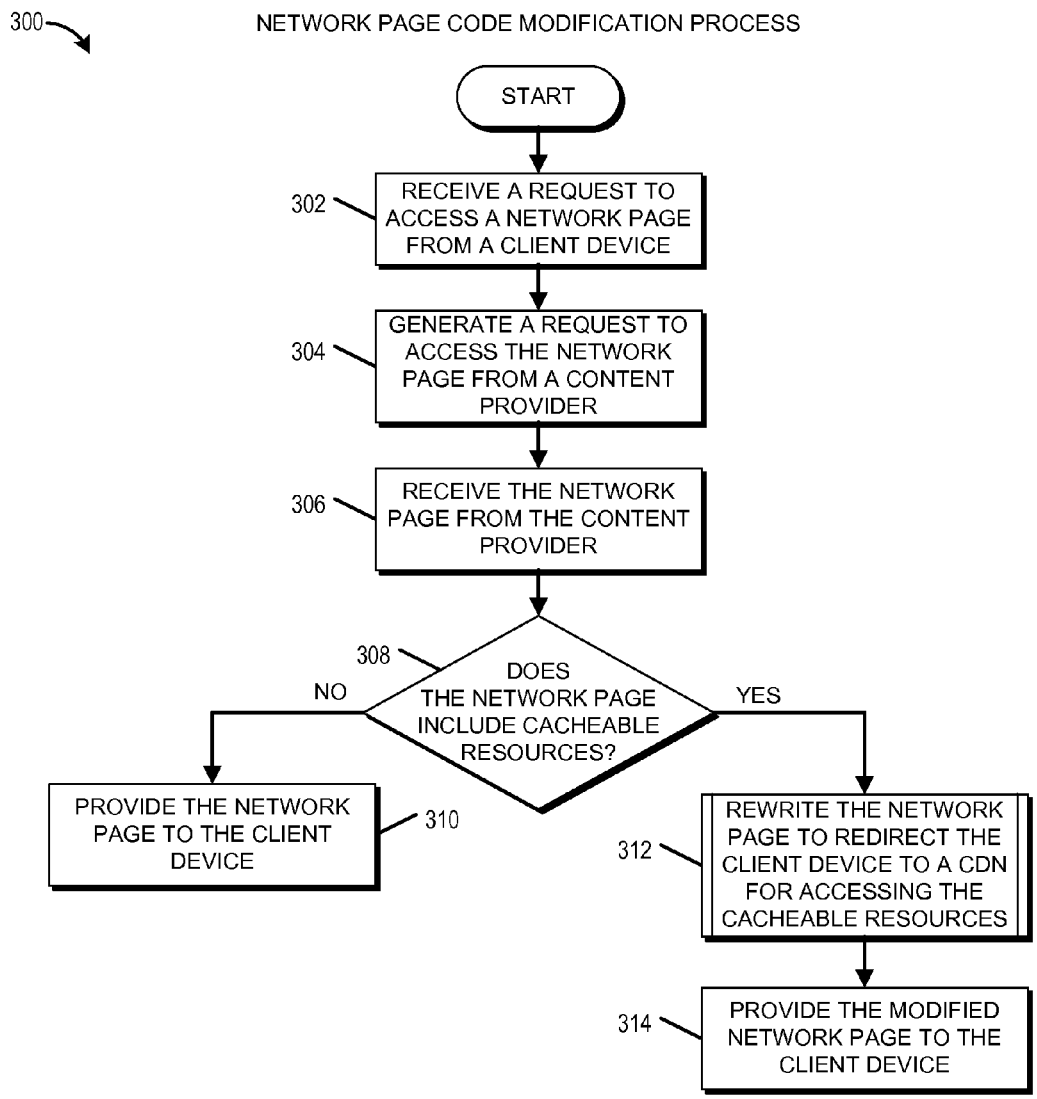
FIG. 3 presents a flowchart of an embodiment of a network page code modification process.

FIG. 3 presents a flowchart of an embodiment of a network page code modification process. The process 300 can be implemented by any system that can modify network page code. For example, the process 300, in whole or in part, can be implemented by a network computing component (e.g., the NCC 136), a network page code modification engine 202, and the proxy server 208, to name a few. Although any number of systems, in whole or in part, can implement the process 300, to simplify discussion, the process 300 will be described with respect to particular systems.

The process 300 begins at block 302 where, for example, the proxy server 208 receives a request to access a network page (e.g., a webpage or network accessible page) from a client device 102, or a user computing system. The request may be received from an application at the client device 102. The application can be any type of application. For example, the application may be a browser (e.g., a web browser) or a mobile application, sometimes termed an "app."

At block 304, the proxy server 208 generates a request to access the network page from a content provider system 104. The proxy server 208 may identify the content provider system 104 based on the request received at the block 302. In some cases, the request generated at the block 304 may be a modified version of the request received at the block 302 to cause the response to the request to be provided to the proxy server 208 instead of the client device 102.

The proxy server 208 receives the network page from the content provider system 104 at the block 306. In some embodiments, at least a portion of the network page may be received from a source other than the content provider system 104. For example, in some such cases, the content provider system 104 may redirect a request for a network page to another computing system.

As previously indicated, the network page can include a number of cacheable resources, such as videos, images, JavaScript, CSS, XML, applets, flash, plug-ins, or other network page resources that an entity associated with a network page has identified as cacheable. Generally, a resource identified as cacheable may include a resource that the entity associated with the network page does not anticipate modifying for a period of time or does not expect another entity associated with the resource to modify the resource for a period of time. In some cases, the network page may include cacheable resources that have not been identified as cacheable due, for example, to coding errors. Moreover, in some cases, the network page may not include any cacheable resources.

At the decision block 308, the network page code modification engine 202 determines whether the network page includes one or more cacheable resources. Determining whether the network page includes a cacheable resource may include accessing a cacheable resource tag or indicator associated with a resource. For example, the decision block 308 may include accessing an HTTP caching header to determine whether a resource referenced in the network page is a cacheable resource. In some cases, the decision block 308 may include accessing a time-to-live indicator associated with the cacheable resource. The time-to-live indicator can include any type of indicator that can facilitate determining a time period for which a cacheable resource may be cached. For example, the time-to-live indicator may identify a time when the cacheable resource will expire, a time when the cacheable resource was created and a length of time the resource may be cached, a length of time remaining before the cacheable resource may be modified or replaced, etc. Typically, although not always, during the time period identified based on the time-to-live indicator, the cacheable resource may be relied upon as being the most recent version of the resource. In certain embodiments, the network page code modification engine 202 may determine whether the time-to-live indicator, or a derived value based on the time-to-live indicator, satisfies a threshold. In cases where the threshold is not satisfied, a resource marked as cacheable may be identified as not cacheable for the purpose of performing the process 300.

If the network page does not include cacheable resources, the proxy server 208 provides the network page to the client device 102 at block 310. Further, in cases where the network page includes a cacheable resource, but a time-to-live indicator associated with the cacheable resource does not satisfy a threshold, the proxy server 208 may provide the network page to the client device 102 at the block 310 without modifying the code associated with the network page. In such cases, the proxy server 208 may obtain a new copy of the cacheable resource for storage at the CDN and/or the NCC. Thus, subsequent accesses to the network page may access the updated cached copy of the cacheable resource if requested before the TTL of the updated cached copy.

In some embodiments, although the network page may include cacheable resources, none of the resources may be cached. For example, if the network page has not been previously requested by a user, has been modified significantly since it was last accessed, or a TTL associated with each cacheable resource of the network page has expired, none of the existing cacheable resources of the network page may be cached. In such cases, the network page may be provided to the client device 102 without rewriting the network page. Further, in such cases, cacheable resources referenced by the network page may be cached at a CDN and/or NCC 136 to, for example, improve the access time of subsequent requests to the network page. An example of a process for caching the cacheable resources associated with the network page is described in more detail with respect to FIG. 5.

If the network page code modification engine 202 determines that the network page does include one or more cacheable resources, the network page code modification engine 202, at block 312, rewrites the code (e.g., HTML code, XHTML code, etc.) of the network page to redirect the client device 102 to a CDN for accessing the one or more cacheable resources. Typically, the CDN (e.g., the CDN that includes the CDN POP 210) is owned by or associated with the same entity as the entity that owns or is associated with the NCC 136. However, in some cases, the CDN may be associated with a separate entity from the entity associated with the NCC 136. Advantageously, in certain embodiments, rewriting the network page code to cause the client 102 to access cacheable resources from the CDN POP 210 instead of the NCC 136 can result in faster access of the cacheable resources compared to accessing the resources via the NCC 136. In some embodiments, the block 312 may be optional. For example, the first time a network page is accessed, the network page may be provided to the client device 102 without modifying the network page code. However, cacheable resources referenced by the network page may be cached to facilitate faster future accesses to cacheable resources referenced by the network page.

The block 312 may also include storing the cacheable resource at the resource cache 214 of the CDN POP 210. In some cases, storing the cacheable resource at the resource cache 214 may be optional. For example, when a network page has previously been accessed within a time period associated with the time-to-live value of the cacheable resource, the cacheable resource may already exist at the resource cache 214. Further, the block 312 may include storing a copy of the cacheable resource at the NCC POP 134, such as at the storage 140.

In cases where the network page includes a plurality of cacheable resources, some of the plurality of cacheable resources may be located at a different CDN POP or at a different CDN associated with a different entity than other cacheable resources of the plurality of cacheable resources. In such cases, the block 312 may include rewriting the network page to redirect the client device to the corresponding CDN POP or CDN for each cacheable resource. Additional optional embodiments of the process of rewriting the network page are described with respect to FIG. 4.

Further, if the network page code modification engine 202 determines that the network page includes one or more cacheable resources, the proxy server 208 may store a copy of the one or more cacheable resources at a CDN and/or at the NCC 136. In some cases, if a cacheable resource is already stored at a CDN, a copy of the cacheable resource is not obtained from the content provider system 104. However, if a TTL value associated with the cacheable resource has expired or been reached, a new copy of the cached resource may be obtained and stored at a CDN. Alternatively, each time a network page is requested, a new copy of the cached resource is obtained thereby increasing the probability that the CDN will have a non-expired copy of the cached resource during a subsequent request for the network page.

At block 314, the proxy server 208 provides the modified network page to the client device 102. As previously stated, in some cases the proxy server 208 may provide an unmodified version of the network page to the client device 102, such as the first time the network page is accessed. In some embodiments, the proxy server 208 may stream or provide a portion of the network page, or code thereof, to the client device 102 before, or while, rewriting code associated with other portions of the network page. For example, portions of the network page not including cacheable resources may be provided to the client device 102 while portions of the network page including cacheable resources are rewritten. Advantageously, by providing portions of the network page to the client device 102 while other portions of the network page code are rewritten, the client device 102 can begin rendering the network page or accessing non-cacheable network resources associated with the network page before receiving the entire network page.

In some cases, some operations associated with the process 300 may be optional including, for example, the block 304, 306, 308, and 312. For instance, in some cases the process 300 may have been performed for a prior access of a network page. In such instances, the network page code modification engine 202 may determine whether cacheable resources associated with the network page are still current based, for example, on the time-to-live values associated with the cacheable resources. If the cacheable resources are still current, the proxy server 208 may provide a previously rewritten version of the network page to the client 102. The previously rewritten version of the network page may be accessed from the storage 140. In some cases, portions of the network page may be obtained from the content provider system 104 and portions may be obtained from the storage 140. In other embodiments, the process 300 may be repeated in its entirety for each request to access the network page to ensure, for example, the latest version of the network page is provided to the client 102.

Example Location-Based Network Page Code Modification Process

Figure 4:
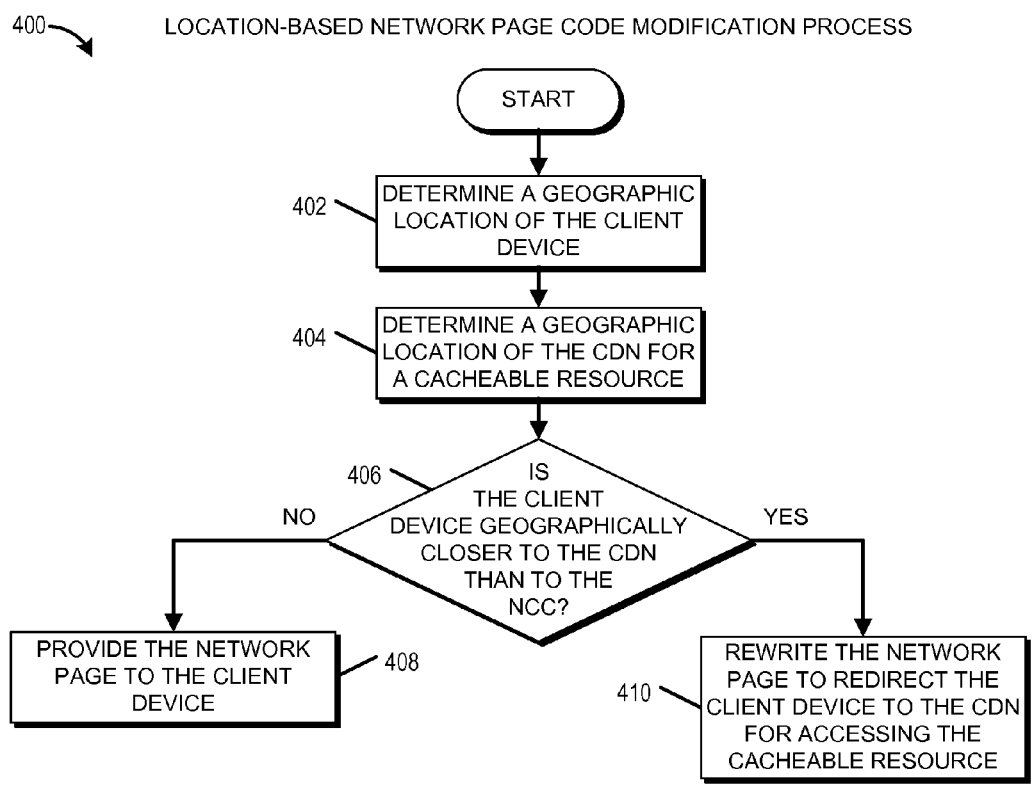
FIG. 4 presents a flowchart of an embodiment of a location-based network page code modification process.

FIG. 4 presents a flowchart of an embodiment of a location-based network page code modification process. The process 400 can be implemented by any system that can modify network page code based, at least partially, on the location of one or more of the client device 102, the CDN or a POP of the CDN (e.g., CDN POP 210) for one or more cacheable resources associated with the network page, and the network computing component (e.g., the NCC 136). For example, the process 400, in whole or in part, can be implemented by a network computing component (e.g., the NCC 136), a network page code modification engine 202, a client location identification system 204, a CDN identification system 206, and the proxy server 208, to name a few. Although any number of systems, in whole or in part, can implement the process 400, to simplify discussion, the process 400 will be described with respect to particular systems.

The process 400 may be performed as at least part of the process associated with the block 312. Alternatively, or in addition, the process 400 may be performed as part of any process for writing or rewriting code for a network page based at least partially on the location of a user computing system, a content provider, a proxy system, and/or a CDN. Further, the process 400, or at least some operations associated with the process 400, may be repeated for each cacheable resource of a network page. For example, in cases where cacheable resources are stored at different locations, the operations associated with the process 400 may be performed separately for each cacheable resource, or for subsets of the cacheable resources located at particular network systems, such as CDNs.

The process 400 begins at block 402 where, for example, the client location identification system 204 determines a geographic location of the client device 102. In some embodiments, the geographic location may be determined based on a network address, such as an Internet Protocol (IP) address. Alternatively, or in addition, the geographic location may be identified based on information provided by a user of the client device 102, such as a zip code. Further, in some cases, the geographic location may be provided by the network 108, such as by a cellular communication service provider. In some instances, the location may be based on cookies or other code at the client device 102.

At block 404, the CDN identification system 206 determines a geographic location of the CDN POP 210 for a cacheable resource. The block 404 may include identifying a CDN POP 210 with the cacheable resource based on a data structure, such as a hash map, that includes a reference to the cacheable resource and one or more locations where the cacheable resource is stored. Further, the CDN POP 210 may be selected from the hash map based on the location of the client device 102 and a geographic region associated with the CDN POP 210 in the data structure. In some cases, the CDN that includes the CDN POP 210 is associated with the same entity as the network computing provider system 107 that includes the NCC 136. Alternatively, the CDN that includes the CDN POP 210 may be associated with a different entity. The geographic location of the CDN POP 210 may be determined based on an IP address, by querying a computing system at the CDN POP 210, information associated with the network page, by accessing a database of location information for CDN POPs, or any information that may be used to determine a CDN POP 210 location. In cases where the CDN POP 210 is associated with the same entity as the NCC 136, the NCC 136 may be configured with the location of the CDN POP 210 or provided with access to a database of CDN POP locations maintained by the entity.

In some embodiments, the NCC 136 may also determine its own geographic location as part of the process 400. The NCC 136 may determine its geographic location by accessing a registry or configuration information associated with the NCC 136 or with the NCC POP 134 to determine the location of the NCC 136. In some cases, the NCC 136 may determine its geographic location based on network information. In other cases, the NCC 136 may be configured by, for example, an administrator with its geographic location. In some cases, the geographic location of the client device 102, the CDN POP 210, and/or the NCC 136 may be determined based on a global positioning system (GPS).

The network page code modification engine 202 determines at the decision block 406 whether the client device 102 is geographically closer to the CDN POP 210 than to the NCC 136, or the NCC POP 134. If the client device 102 is not closer to the CDN POP 210 than to the NCC 136, the proxy server 208 provides the network page to the client device 102 at block 408 without rewriting the network page. Thus, in some embodiments, even when the network page includes a cacheable resource, the network page code modification engine 202 may not rewrite the network page code as part of the process associated with the block 312.

If the client device 102 is closer to the CDN POP 210 than to the NCC 136, the network page code modification engine 202 rewrites the network page to redirect the client device 102 to the CDN POP 210 for accessing the cacheable resource. In some embodiments, the block 410 may include some or all of the embodiments previously described with respect to the block 312. The process 400 may then include providing the rewritten network page to the client device 102 as described with respect to the block 314.

In some embodiments, the process 400 may be based on a network location instead of, or in addition to, a geographic location. For example, in some cases, the blocks 402 and 404 may include determining a location of the client device 102 and the CDN POP 210 respectively on the network 108. The decision block 406 may then determine whether the client device is closer to the resource cache 214 at the CDN POP 210 or the NCC 136 at the NCC POP 134 based on a distance within the network 108, such as the minimum or average number of network hops between the systems. In some embodiments, a combination, which may be a weighted combination, of the geographic distance and a network distance between the systems may be used at the decision block 406 to determine whether the client device is closer to the resource cache 214 of the CDN POP 210 or the NCC 136.

Further, in certain embodiments, a measure of the quality of the connection between network hops may be used to determine whether to rewrite the network page. For example, if the connections in the network 108 between the client 102 and the resource cache 214 at the CDN POP 210 are faster or have lower latency than the connections in the network 108 between the client 102 and the NCC 136, the network page code modification engine 202 may rewrite the network page even in some cases where the NCC POP 134 is closer to the client device 102 than the CDN POP 210.

In some embodiments, a difference in cost of accessing the cacheable resource at the CDN compared to the NCC may be used to determining whether to rewrite the network page. The cost may be a monetary cost and/or based on a number of additional or substitute factors. For example, the cost may be based on electricity or energy consumption, network bandwidth consumption, network resource consumption, latency impact, network connections established, etc. Further, in some cases, the cost may be associated with a quality of service. In such cases, the system, or network connection, that can provide a higher quality of service may be considered as lower cost. The quality of service may be based on a number of quality of service factors. For example, the quality of service factors may include amount of bandwidth available, latency of connections, rate of dropped or lost connections, rate of repeated packet requests, etc.

Example Content Delivery Network Selection Process

Figure 5:
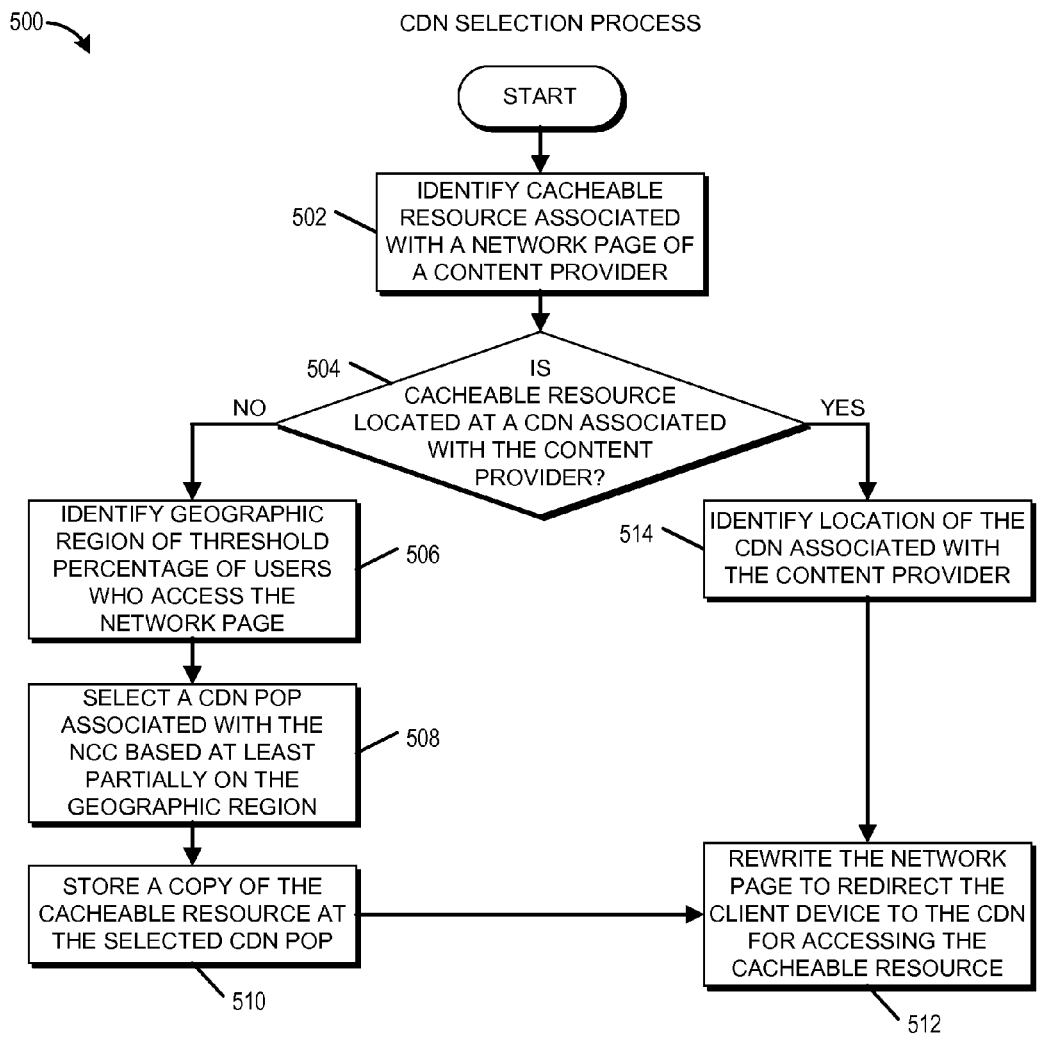
FIG. 5 presents a flowchart of an embodiment of a content delivery network selection process.

FIG. 5 presents a flowchart of an embodiment of a content delivery network selection process. The process 500 can be implemented by any system that can select a content delivery network, or a content distribution network, to store and/or provide access to a cacheable resource of a network page. Further, in some cases, the process 500 can be implemented by any system that can select a POP of a selected CDN. For example, the process 500, in whole or in part, can be implemented by a network computing component (e.g., the NCC 136), a network page code modification engine 202, a client location identification system 204, a CDN identification system 206, and the proxy server 208, to name a few. Although any number of systems, in whole or in part, can implement the process 500, to simplify discussion, the process 500 will be described with respect to particular systems.

In some embodiments, the process 500 may be performed in response to receiving a request for a network page. In other embodiments, the process 500 may be performed in response to prior requests for the network page by the user or by other users. Further, in some cases, the process 500 may be performed as part of a network crawling, or web crawling, process.

The process 500 begins at block 502 where, for example, a network computing component (e.g., the NCC 136) identifies a cacheable resource associated with a network page of a content provider (e.g., the content provider system 104). In certain embodiments, the block 502 can include some or all of the embodiments described with respect to the decision block 308.

At decision block 504, the NCC 136 determines whether the cacheable resource is located at a CDN (e.g., the CDN that includes the CDN POP 116) associated with the content provider system 104. Determining whether the cacheable resource is location at the CDN may include analyzing a path (e.g., a URL path) for accessing the cacheable resource, a tag (e.g., an XML tag) associated with the cacheable resource, or any other data or metadata that may be used to determine where the cacheable resource may be located. Further, in some cases, the decision block 504 may include accessing a whitelist to identify whether the network page is associated with an entity that maintains a CDN or that utilizes a CDN for storing cacheable resources.

If the cacheable resource is not located at a CDN associated with the content provider system 104, the client location identification system 204 identifies a geographic region of a threshold percentage of users who access the network page at block 506. The geographic region can be defined based on any type of boundary or characteristic associated with the geographic region. For example, the geographic regions may be based on one or more geographic, social, political, or legal boundaries. Further, the geographic regions may be defined based on a user (e.g., an administrator) configuration. Non-limiting examples of geographic regions can include states, counties, countries, and geographic area (e.g., 100 square miles). Further, in some cases, the geographic regions may be defined based on zones of control associated with CDN POPs for a CDN associated with the network computing provider system 107.

In some cases, the threshold percentage of users may be configured by a user (e.g., an administrator). Further, the threshold percentage may be defined as a relative threshold. For example, the threshold percentage may be defined as the highest percentage of users. In some cases, the threshold percentage of users may be set such that a single geographic region satisfies the threshold. In some such cases, if no geographic region achieves the threshold, the process 500 may end and a CDN may not be used for the network page. Alternatively, the geographic region with the highest percentage of users who access the network page may be selected. In other embodiments, each geographic region that satisfies the threshold percentage may be selected. In such cases, the process 500 may be used to select multiple CDN POPs to host a copy of the cacheable resource. In some embodiments, the block 506 may identify a geographic region that includes an absolute number of users that satisfy a threshold.

The CDN identification system 206, at block 508, selects a CDN POP (e.g., CDN POP 210) associated with the NCC 136 based, at least partially, on the geographic region identified at the block 506. As previously stated, in some cases, multiple CDN POPs may be selected, such as in cases where multiple geographic regions satisfy a threshold. In some embodiments, a CDN POP may be selected to conform with legal requirements. For example, to satisfy laws of a particular country, a CDN POP may be selected so that cacheable resources for the network page do not enter and/or leave the country.

At block 510, the NCC 136 stores a copy of the cacheable resource at the selected CDN POP (e.g., CDN POP 210) identified at the block 508. In some cases, the NCC 136 stores a copy of the cacheable resource at multiple CDN POPs as selected at the block 508. Storing the copy of the cacheable resource at the CDN POPs may include storing the cacheable resource at a resource cache (e.g., the resource cache 214) for each CDN POP.

In some embodiments, the block 510 may include creating or modifying a data structure, such as a hash map or hash table, to track where a cacheable resource is stored, such as the CDN POP selected as part of the process of the block 508. Further, in some cases, the data structure may include the identity of a geographic region associated with the selected CDN POP. Client devices 102 that are determined to be within the geographic region associated with the selected CDN POP may be provided with a rewritten or modified network page that directs or redirects the client device 102 to access the cacheable resource from the selected CDN POP. Client devices 102 that are not within the geographic region may be provided a network page that is not rewritten or that is rewritten to access the cacheable resource from another CDN POP. Thus, in some cases, the data structure may include multiple entries for a cacheable resource with each entry identifying the storage location for the cacheable resource and a geographic region associated with the particular entry. The data structure may be stored at the storage 140 of each NCC 136. In some cases, each NCC may update other NCCs each time the data structure or cacheable resources is updated or modified.

The network page code modification engine 202 rewrites, at block 512, the network page to redirect the client device 102 to the CDN POP selected at the block 508 for accessing the cacheable resource.

If the cacheable resource is located at a CDN associated with the content provider system 104, the CDN identification system 206 identifies a location of the CDN associated with the content provider system 104 at block 514. In some cases, identifying the location of the CDN associated with the content provider system 104 may include identifying a CDN POP (e.g., the CDN POP 116) for the CDN. At the block 512, the network page code modification engine 202 rewrites the network page to redirect the client device 102 to the CDN identified at the block 514 to access the cacheable resource. In some embodiments, the block 512 may be optional in cases where the cacheable resource is located at the CDN associated with the content provider system 104. For example, in such cases, the network page may already refer to the CDN. As a second example, the entity associated with the NCC 136 may choose to have cacheable resources accessed via the proxy server 208 instead of by accessing the CDN associated with the content provider system 104.

The process 500 may be repeated for a cacheable resource based on a time-to-live (TTL) value associated with the cacheable resource. The frequency that the process 500 is repeated can depend on the TTL value. For example, if the TTL value for a cacheable resource is 48 hours, the process 500 may be repeated every 48 hours. Further, the frequency that the process 500 is performed may vary if the TTL value for the cacheable resource changes in subsequent performances of the process 500.

In some embodiments, the process 500 may include selecting a CDN POP for a CDN associated with the network computing provider system 107 and storing a copy of the selected resource at the selected CDN POP regardless of whether a CDN is associated with the content provider system 104. For example, in some cases, the entity associated with the network computing provider system 107 may decide to use its own CDN regardless of whether the cacheable resource is already stored at a CDN. As another example, in cases a POP for the CDN associated with the network computing provider system 107 is closer than POPs for the CDN associated with the content provider system 104, it may be advantageous to use the CDN associated with the network computing provider system 107 to improve access speed for the cacheable resource.

Terminology

A number of computing systems have been described throughout this disclosure. The descriptions of these systems are not intended to limit the teachings or applicability of this disclosure. For example, the network computing component 136 described herein can generally include any computing device(s), such as desktops, laptops, servers, and distributed computing systems, to name a few. As a second example, the client devices 102 can generally include any computing device(s), such as desktops, laptops, servers, video game platforms, television set-top boxes, televisions (e.g., internet TVs), computerized appliances, and wireless mobile devices (e.g. smart phones, PDAs, tablets, electronic book readers, or the like), to name a few. Further, it is possible for the user systems described herein to be different types of devices, to include different applications, or to otherwise be configured differently. In addition, the user systems described herein can include any type of operating system ("OS"). For example, the mobile computing systems described herein can implement an Android™ OS, a Windows® OS, a Mac® OS, a Linux or Unix-based OS, or the like.

Further, the processing of the various components of the illustrated systems can be distributed across multiple machines, networks, and other computing resources. In addition, two or more components of a system can be combined into fewer components. For example, the various systems illustrated as part of the network computing component 136 can be distributed across multiple computing systems, or combined into a single computing system. Further, various components of the illustrated systems can be implemented in one or more virtual machines, rather than in dedicated computer hardware systems. Likewise, the data repositories shown can represent physical and/or logical data storage, including, for example, storage area networks or other distributed storage systems. Moreover, in some embodiments the connections between the components shown represent possible paths of data flow, rather than actual connections between hardware. While some examples of possible connections are shown, any of the subset of the components shown can communicate with any other subset of components in various implementations.

Depending on the embodiment, certain acts, events, or functions of any of the algorithms, methods, or processes described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially.

Each of the various illustrated systems may be implemented as a computing system that is programmed or configured to perform the various functions described herein. The computing system may include multiple distinct computers or computing devices (e.g., physical servers, workstations, storage arrays, etc.) that communicate and interoperate over a network to perform the described functions. Each such computing device typically includes a processor (or multiple processors) that executes program instructions or modules stored in a memory or other non-transitory computer-readable storage medium. The various functions disclosed herein may be embodied in such program instructions, although some or all of the disclosed functions may alternatively be implemented in application-specific circuitry (e.g., ASICs or FPGAs) of the computer system. Where the computing system includes multiple computing devices, these devices may, but need not, be co located. The results of the disclosed methods and tasks may be persistently stored by transforming physical storage devices, such as solid state memory chips and/or magnetic disks, into a different state. Each process described may be implemented by one or more computing devices, such as one or more physical servers programmed with associated server code.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. In addition, the articles "a" and "an" are to be construed to mean "one or more" or "at least one" unless specified otherwise.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

While the above detailed description has shown, described, and pointed out novel features as applied to various embodiments, it will be understood that various omissions, substitutions, and changes in the form and details of the devices or algorithms illustrated can be made without departing from the spirit of the disclosure. Thus, nothing in the foregoing description is intended to imply that any particular feature, characteristic, step, operation, module, or block is necessary or indispensable. As will be recognized, the processes described herein can be embodied within a form that does not provide all of the features and benefits set forth herein, as some features can be used or practiced separately from others. The scope of protection is defined by the appended claims rather than by the foregoing description. All changes which come within the meaning and range of equivalency of the claims are to be embraced within their scope.

What is claimed is:

1. A method for selecting a cacheable resource location, the method comprising:
　by a network computing component associated with a first entity and comprising one or more processors:
　　receiving a cacheable resource associated with a network page;
　　in response to determining that the cacheable resource is not stored at a content delivery network:
　　　identifying a geographic region that includes a threshold number of users who access the network page;
　　　selecting a content delivery network system from a plurality of content delivery network systems based at least in part on the identified geographic region, wherein the content delivery network system is selected from the plurality of content delivery network systems using a hash map indexed based at least in part on a geographic location of a client device; and
　　　storing a copy of the cacheable resource at the content delivery network system;
　　receiving a request from the client device to access the network page, the client device located within the geographic region;
　　determining whether the geographic location of the client device is closer to a geographic location of the content delivery network system or a geographic location of the network computing component; and
　　in response to determining that the geographic location of the client device is geographically closer to the geographic location of the content delivery network system than to the geographic location of the network computing component:
    rewriting code associated with the network page to cause the client device to access the cacheable resource from the content delivery network system;
    providing the rewritten code to the client device; and
    refreshing a copy of the cacheable resource stored at the content delivery network system, reducing the probability that a subsequent request to access the network page will occur when a time-to-live value associated with the cacheable resource stored at the content delivery network system does not satisfy a threshold value.

2. The method of claim 1, further comprising, in response to determining that the geographic location of the client device is geographically closer to the geographic location of the network computing component than to the geographic location of the content delivery network, providing the code associated with the network page to the client device enabling the client device to access the cacheable resource via the network computing component.

3. The method of claim 1, wherein determining the geographic location of the client device comprises determining the geographic location of the client device based at least partially on a network address associated with the client device.

4. The method of claim 1, wherein the content delivery network system is associated with an entity associated with the network computing component.

5. The method of claim 1, wherein determining the geographic location of the content delivery network system storing the cacheable resource comprises:
    accessing a data structure comprising a set of relationships between cacheable resources and a set of content delivery network systems, the set of content delivery network systems including the content delivery network system; and
    identifying the content delivery network system from the data structure.

6. The method of claim 5, wherein identifying the content delivery network system from the data structure comprises identifying the content delivery network system based at least in part on the content delivery network system storing the cacheable resource and on a service area associated with the content delivery network system.

7. The method of claim 6, wherein the service area reflects the geographic region serviced by the content delivery network system.

8. The method of claim 6, wherein the service area reflects a portion of a computing network serviced by the content delivery network system.

9. A system configured to select a cacheable resource location, the system comprising:
    a network computing component comprising one or more hardware processors in electrical communication with a memory that stores cacheable resources, the network computing component configured to:
        receive a cacheable resource associated with a network page;
        in response to determining that the cacheable resource is not stored at a content delivery network:
            identify a geographic region that includes a threshold number of users who access the network page;
            select a content delivery network system from a plurality of content delivery network systems based at least in part on the identified geographic region, wherein the content delivery network system is selected from the plurality of content delivery network systems using a hash map indexed based at least in part on a geographic location of a computing system; and
            store a copy of the cacheable resource at the content delivery network system;
        receive a request from the computing system to access the network page, the computing system located within the geographic region; and
        in response to determining that a location of the computing system is closer to a location of the content delivery network system than to a location of the network computing component:
            rewrite code associated with the network page to cause the computing system to access the cacheable resource from the content delivery network system;
            provide the rewritten code to the computing system; and
            refresh the copy of the cacheable resource stored at the content delivery network system, reducing the probability that a subsequent request to access the network page will occur when the time-to-live value associated with the cacheable resource stored at the content delivery network system does not satisfy a threshold value.

10. The system of claim 9, wherein the location of the computing system and the location of the content delivery network system comprise geographic locations.

11. The system of claim 9, wherein the location of the computing system and the location of the content delivery network system comprise locations within a network.

12. The system of claim 11, wherein the network computing component is configured to determine whether the location of the computing system is closer to the location of the content delivery network system or the location of the network computing component based at least partially on a number of network hops between the computing system and the content delivery network system and between the computing system and the network computing component.

13. The system of claim 9, wherein the network computing component is configured to determine the location of the computing system based at least partially on a network address associated with the computing system.

14. The system of claim 9, wherein the network computing component is further configured to provide to the computing system a first portion of the rewritten code corresponding to a first portion of the code while rewriting a second portion of the code.

15. The system of claim 9, wherein, in response to determining that the location of the computing device is closer to the location of the network computing component, the network computing component is further configured to provide the code associated with the network page to the computing device without rewriting the code.

16. The system of claim 9, wherein the network computing component and the content delivery network system are associated with the same entity.

17. Non-transitory physical computer storage comprising instructions stored thereon that, when executed by one or more processors, are configured to implement a system for selecting a cacheable resource location, the system comprising:

a network computing component configured to:
receive a cacheable resource associated with a network page;
in response to determining that the cacheable resource is not stored at a content delivery network:
identify a geographic region that includes a threshold number of users who access the network page;
select a content delivery network system from a plurality of content delivery network systems based at least in part on the identified geographic region, wherein the content delivery network system is selected from the plurality of content delivery network systems using a hash map indexed based at least in part on a geographic location of a computing system; and
store a copy of the cacheable resource at the content delivery network system;
receive a request from the computing system to access the network page, the computing system located within the geographic region;
determine whether a first cost associated with the computing system accessing the cacheable resource from a content delivery network system storing a copy of the cacheable resource is lower than a second cost associated with the computing system accessing the cacheable resource via the network computing component; and
in response to determining that the first cost associated with the computing system accessing the cacheable resource from the content delivery network system is lower than the second cost associated with the computing system accessing the cacheable resource via the network computing component:
rewrite code associated with the network page to reference the copy of the cacheable resource stored at the content delivery network system;
provide the rewritten code to the computing system; and
refresh the copy of the cacheable resource stored at the content delivery network system, reducing the probability that a subsequent request to access the network page will occur when the time-to-live value associated with the cacheable resource stored at the content delivery network system does not satisfy a threshold value.

18. The non-transitory physical computer storage of claim 17, wherein the first cost is based at least partially on a location of the computing system and a location of the content delivery network system, and wherein the second cost is based at least partially on the location of the computing system and a location of the network computing component.

19. The non-transitory physical computer storage of claim 17, wherein the location of the computing system and the location of the content delivery network system comprise geographic locations.

20. The non-transitory physical computer storage of claim 17, wherein the location of the computing system and the location of the content delivery network system comprise locations within a network.

21. The non-transitory physical computer storage of claim 20, wherein the first cost is based at least partially on a number of network hops between the computing system and the content delivery network system, and wherein the second cost is based at least partially on a number of network hops between the computing system and the network computing component.

22. The non-transitory physical computer storage of claim 20, wherein the first cost is based at least partially on a first quality of service measure for communicating between the computing system and the content delivery network, and wherein the second cost is based at least partially on a second quality of service measure for communicating between the computing system and the network computing component.

23. The non-transitory physical computer storage of claim 17, wherein the network computing component and the content delivery network system are associated with the same entity.

* * * * *